(12) United States Patent
Lee et al.

(10) Patent No.: US 9,367,142 B2
(45) Date of Patent: Jun. 14, 2016

(54) EYEGLASSES ATTACHED WITH PROJECTOR AND METHOD OF CONTROLLING THE SAME

(71) Applicant: Samsung Display Co., Ltd., Yongin, Gyeonggi-do (KR)

(72) Inventors: Hyun-Jae Lee, Yongin (KR); Mu-Gyeom Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 37 days.

(21) Appl. No.: 14/062,727

(22) Filed: Oct. 24, 2013

(65) Prior Publication Data
US 2014/0313121 A1 Oct. 23, 2014

(30) Foreign Application Priority Data
Apr. 18, 2013 (KR) .......................... 10-2013-0043029

(51) Int. Cl.
| | | |
|---|---|---|
| G06F 3/03 | (2006.01) |
| G02B 27/22 | (2006.01) |
| G02C 11/00 | (2006.01) |
| G02C 11/04 | (2006.01) |
| G02B 27/01 | (2006.01) |

(52) U.S. Cl.
CPC .............. *G06F 3/0304* (2013.01); *G02C 11/04* (2013.01); *G02C 11/10* (2013.01); *G02B 27/017* (2013.01)

(58) Field of Classification Search
USPC ................................ 345/156; 351/158; 353/7
See application file for complete search history.

(56) References Cited

U.S. PATENT DOCUMENTS

| | | | |
|---|---|---|---|
| 8,228,315 B1 * | 7/2012 | Starner ................ | G02B 27/017 345/175 |
| 2007/0047043 A1 * | 3/2007 | Kapellner et al. .............. | 359/30 |
| 2012/0218172 A1 | 8/2012 | Border et al. | |
| 2012/0262558 A1 | 10/2012 | Boger et al. | |
| 2013/0300637 A1 * | 11/2013 | Smits ..................... | G03B 35/18 345/8 |

FOREIGN PATENT DOCUMENTS

JP 2008-176681 A 7/2008

* cited by examiner

*Primary Examiner* — Jason Olson
*Assistant Examiner* — Deeprose Subedi
(74) *Attorney, Agent, or Firm* — Lewis Roca Rothgerber Christie LLP

(57) ABSTRACT

Eyeglasses including a lens unit including a pair of lenses and a frame, a supporting unit supporting the lens unit, a camera mounted on the frame, a projector mounted on the frame and configured to project content on a screen, and a processor configured to control the camera and the projector. A method of controlling eyeglasses, including generating a first projector image to be projected on a screen by a projector mounted on the eyeglasses, obtaining a camera image from a camera mounted on the eyeglasses, and generating a first user input signal by analyzing the camera image.

14 Claims, 2 Drawing Sheets

EYEGLASSES ATTACHED WITH PROJECTOR AND METHOD OF CONTROLLING THE SAME

CROSS-REFERENCE TO RELATED APPLICATION

This application claims priority to and the benefit of Korean Patent Application No. 10-2013-0043029, filed on Apr. 18, 2013 in the Korean Intellectual Property Office, the entire content of which is incorporated herein by reference.

BACKGROUND

1. Field

The present invention relates to eyeglasses having an attached projector and a method of controlling the eyeglasses.

2. Description of the Related Art

Projectors receive image signals and project images, such as consistent images, on screens by using lens systems. Projectors may project images by using very bright light. Recent projectors may display more defined images by correcting images to account for factors such as screens not being even or viewing spaces being too bright. Recently, projectors have been generally used in the classroom, for presentations in meeting rooms, and home theater applications. Due to development of technology, projectors of various sizes from mini-sized projectors to thin film pico projectors and other hand-held projectors have been released.

SUMMARY

Aspects of embodiments of the present invention relate to eyeglasses having an attached projector, allowing a user to freely project images on a screen or other suitable display surface and to watch content thereof in, for example, a mobile environment. Embodiments of the present invention also provide for eyeglasses having an attached camera and a microphone to receive an inputted command of a user by using gesture recognition and voice recognition technologies.

According to an embodiment of the present invention, eyeglasses are provided. The eyeglasses include a lens unit including a pair of lenses and a frame, a supporting unit supporting the lens unit, a camera mounted on the frame, a projector mounted on the frame and configured to project content on a screen, and a processor configured to control the camera and the projector.

The projector may be a pico projector that is mounted in the frame of the eyeglasses.

The screen may be a hand of a human.

The processor may include a content generation unit configured to generate a projector image to be projected by the projector, and an image recognition unit configured to process and analyze a camera image obtained from the camera and to convert the camera image into a user input signal.

The image recognition unit may be configured to detect whether or not the user input signal comprises a content operation signal. The content generation unit may be further configured to modify the projector image based on the detected content operation signal.

The content operation signal may be a gesture of a user. The processor may be configured to detect the content operation signal by using a gesture recognition algorithm.

The eyeglasses may further include a microphone capable of obtaining a voice command of a user.

The processor may include a voice recognition unit configured to process and analyze the voice command of the user obtained from the microphone, and to convert the voice command into a user input signal.

The processor may be further configured to detect whether or not the user input signal includes a content operation signal, and to modify a projector image to be projected by the projector based on the detected content operation signal.

A number of projectors may be two and a number of cameras mounted on the eyeglasses may be two.

The processor may be further configured to generate two different projector images that, when respectively projected by the two projectors, form a three-dimensional image on the screen.

According to another embodiment of the present invention, eyeglasses are provided. The eyeglasses include a camera mounted between lenses of the eyeglasses, a projector mounted on a connection part between one of the lenses of the eyeglasses and a supporting unit, a microphone mounted on the eyeglasses, and a processor configured to control the camera and the projector. The processor is further configured to generate a projector image to be projected by the projector, and to generate a user input signal by analyzing a camera image obtained from the camera and a voice command obtained from the microphone.

According to yet another embodiment of the present invention, a method of controlling eyeglasses is provided. The method includes generating a first projector image to be projected on a screen by a projector mounted on the eyeglasses, obtaining a camera image from a camera mounted on the eyeglasses, and generating a first user input signal by analyzing the camera image.

The projector may be a pico projector that is mounted in a frame of the eyeglasses.

The screen may be a hand of a human.

The method may further include generating a second projector image by modifying the first projector image when the first user input signal includes a content operation signal with respect to the first projector image.

The content operation signal may be a gesture of a user. The generating of the first user input signal may include detecting the content operation signal by using a gesture recognition algorithm.

The method may further include generating a second user input signal by obtaining and analyzing a voice command from a microphone mounted on the eyeglasses.

A number of projectors may be two and a number of cameras mounted on the eyeglasses may be two.

The generating of the first projector image may include generating two projector images for forming a three-dimensional projector image. The obtaining of the camera image may include obtaining two camera images for forming a three-dimensional camera image.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION

Figure 1:
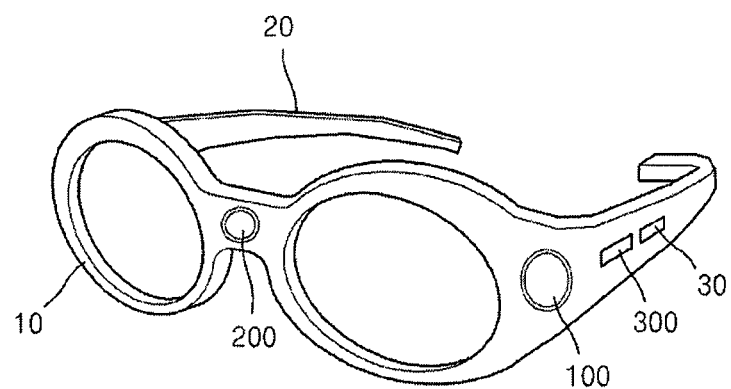
FIG. 1 is a schematic view illustrating eyeglasses having an attached projector, according to an embodiment of the present invention.

Example embodiments of the present invention will be described with reference to the attached drawings. The embodiments will be described to allow one of ordinary skill in the art to practice embodiments of the present invention. It may be understood that various embodiments of the present invention are different from one another but are not mutually exclusive. For example, certain shapes, configurations, and properties described in the specification may be provided while being changed from one embodiment to another embodiment within a range of the scope of the present invention. In addition, locations or arrangements of individual elements in the respective embodiments may be changed within a range of the scope of the present invention. Accordingly, the following detailed description is not to limit the scope of the present invention, which should be understood to include the scope claimed by claims and all equivalents thereof. In the drawings, like reference numerals designate like elements equal or similar to one another through various aspects.

Hereinafter, to allow a person skilled in the art to practice the present invention, various embodiments of the present invention will be described in detail with reference to the attached drawings. Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

FIG. 1 is a schematic view illustrating eyeglasses having an attached projector 100, according to an embodiment of the present invention.

Referring to FIG. 1, the eyeglasses include a lens unit 10 and a supporting unit 20, which are elements of general eyeglasses, along with the projector 100, a camera 200, a processor 300, and a microphone 30. The lens unit 10 and the supporting unit 20 of the eyeglasses may use elements of general eyeglasses with no limitation. The lens unit 10 may include lenses and a frame surrounding the lenses to provide refractive images to a user. In addition, the supporting unit 20 may be temples connected to the lens unit 10 to allow the lens unit 10 to be stably mounted on a face of the user. The lens unit 10 and the supporting unit 20 shown in FIG. 1 may be changed in various embodiments.

The projector 100 receives an image data signal from the processor 300 and projects the image data signal on a screen separated from the eyeglasses by an interval, such as a certain interval. The projector 100 may be a subminiature projection device insertable inside the eyeglasses. For example, the projector may be mounted on a frame of the eyeglasses. Particularly, the projector 100 may be a pica projector with a light projection lens having a diameter of 3 centimeters (cm) or less.

Generally, projectors are devices that project light to display images (for example, on a projected plane) and to form images on the projected plane such that users may see the images. With display devices, whose size of a screen thereof is the size of an image, to enlarge the size of the image, costs are incurred commensurate with increasing the screen for an enlarged display. However, with projectors, because an image may be projected on a screen while enlarging the image through a lens, it is possible to project a larger (e.g., a significantly larger) image than a lens surface thereof on a projected plane to display the image.

The projector 100 may be inserted into the eyeglasses. As described above, since projectors may project larger scenes than the size of lenses on projected planes, the sizes of projector bodies may be decreased to allow the projector 100 to be inserted into eyeglasses. Accordingly, even in a mobile environment with no additional display device, the eyeglasses with the projector 100 may display images on a screen having a sufficient flatness, such as a flatness greater than a certain degree.

Accordingly, the user may view images of desired content by using the projector 100 inserted in the eyeglasses with no particular limitation. For example, a screen, that is, a projected plane of the projector 100, may be a palm of the user. That is, with no additional screen, the user may view (for example, inspect or check) an image of the projector 100, which is projected and displayed on the palm of the user.

Figure 2:
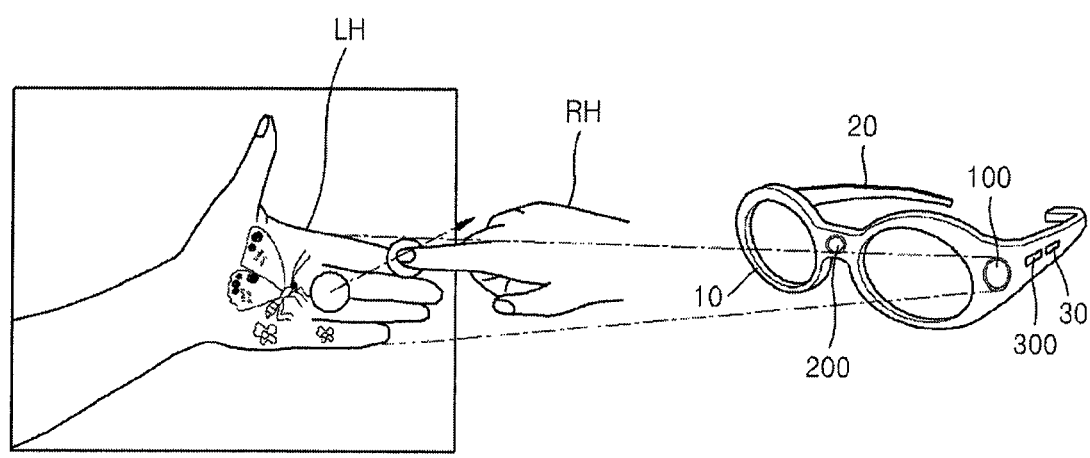
FIG. 2 is a view illustrating an example of the projector projecting an image on a palm of a user, according to an embodiment of the present invention.

FIG. 2 is a view illustrating an example of the projector 100 projecting an image on the palm of the user, according to an embodiment of the present invention.

Referring to FIG. 2, it may be understood that the projector 100 is projecting an image on a left hand of the user (i.e., a human hand). Through the method described above and elsewhere in this disclosure, the user may use the palm of a hand as a screen of the projector 100. In general, the projector 100 may use any plane (for example, a flat surface, such as a wall) having a flatness greater than a certain degree as the screen, and is not limited to using the palm of the user.

In FIG. 1, one projector 100 is located between one end of the lens unit 10 and the supporting unit 20 connected thereto. However, the projector 100 may be located anywhere in the eyeglasses from which images may be projected.

In some embodiments, the eyeglasses may include input devices, such as the camera 200 and the microphone 30, in addition to an output device, such as the projector 100. The projector 100 outputs, that is, projects an image in a direction in which the lenses of the eyeglasses face, the camera 200 captures or otherwise obtains an image in the direction in which the lenses of the eyeglasses face, and the microphone 30 obtains sound waves propagating around the eyeglasses and converts the sound waves into electric signals.

In more detail, the camera 200 captures a scene or an image that the user looks at and, concurrently (such as simultaneously), photographs a gesture done or performed by the user in a projected scene in real time. In this case, the camera 200 may be located between the pair of lenses in such a way that the image captured by the camera 200 is a front image that the user views or watches through the eyeglasses.

In addition, the microphone 30 captures or otherwise obtains sound waves occurring around the eyeglasses and converts the sound waves into an electric signal. The microphone 30 may be a directional microphone obtaining only a sound source in a certain direction. In FIG. 1, the microphone 30 is located on the supporting unit 20 but it is not limited thereto and may be located at any appropriate location of the eyeglasses available for obtaining sound waves.

The processor 300 administrates and controls an image projected by the projector 100, processes and analyzes an image and sound waves obtained by the camera 200 and the microphone 30, respectively, and converts the image and sound waves into user input signals. For example, the user input signals may indicate a signal inputted by the user to control the eyeglasses having the attached projector 100. As a further example, the user input signal may be a content operation signal inputted to operate the image projected by the projector 100.

Figure 3:
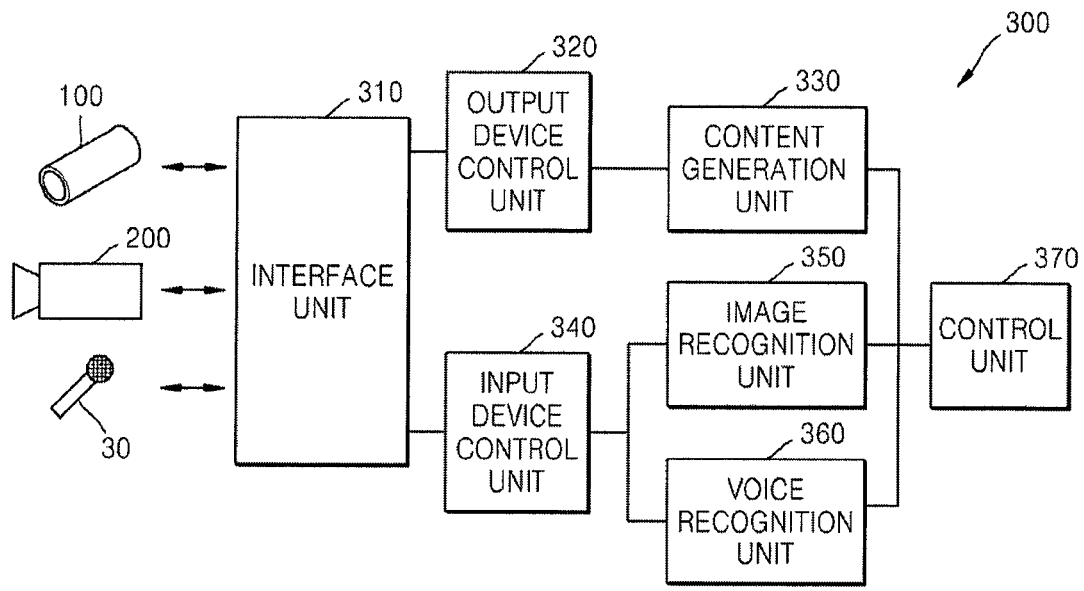
FIG. 3 is a block view illustrating an inner configuration of a processor according to an embodiment of the present invention.

FIG. 3 is a block view illustrating an inner configuration of the processor 300 according to an embodiment of the present invention.

Referring to FIG. 3, the processor 300 includes an interface unit 310, an output device control unit 320, a content generation unit 330, an input device control unit 340, an image recognition unit 350, a voice recognition unit 360, and a control unit 370.

The interface unit 310 provides a communication interface between an input device (such as the projector 100, the camera 200, and the microphone 30) and elements of the processor 300. The interface unit 310 may function as an analog front end.

The output device control unit 320 controls the projector 100 to project an image received from the content generation unit 330. The content generation unit 330 generates an image to be projected by the projector 100 by using data inputted by the user or previously stored in the processor 300. Though not shown in FIG. 3, the processor 300 may additionally include a communication driver to allow communication with external devices, and the content generation unit 330 may generate image data by using data transmitted from an external device.

The input device control unit 340 controls setup and operations of the camera 200 and the microphone 30, and transmits obtained image data and voice data to the image recognition unit 350 and the voice recognition unit 360, respectively.

The image recognition unit 350 receives an image, captured by the camera 200, from the input device control unit 340, and processes or analyzes the image. In more detail, the image recognition unit 350 analyzes the image captured by the camera 200 to analyze whether the user has done a gesture (such as a certain gesture) or not and converts an image signal into a user input signal based on the analysis. In addition, the user input signal may be a content operation signal to change or generate an image that is or will be projected by the projector 100.

The image recognition unit 350 may use a gesture recognition algorithm to convert the image signal into the user input signal. The gesture recognition algorithm is an algorithm for recognizing a motion of the user from an image and converting the motion into a command, such as a certain command. The image recognition unit 350 may extract a user input signal from an image by using a general gesture recognition algorithm with no limitation.

For example, in FIG. 2, the user may do a certain gesture by using a right hand RH to input a command while watching an image projected by the projector 100 on a left hand LH. As shown in FIG. 2, when a gesture of moving the right hand RH from left to right is done and the camera 200 obtains an image of the gesture, the image recognition unit 350 may analyze a corresponding image and may convert the image into a command of turning or otherwise changing images to be projected from one to another.

The voice recognition unit 360 receives, for example, a voice command of the user, obtained by the microphone 30, from the input device control unit 340, converts and analyzes the voice command into an electric signal, and generates a user input signal corresponding thereto. For example, when the user says, "a next scene" and the microphone 30 recognizes the voice command of the user, the voice recognition unit 360 generates and transmits a control unit command for turning to a next page to the control unit 370.

The control unit 370 controls a data flow between the content generation unit 330, the image recognition unit 350, and the voice recognition unit 360, and external devices from/to one another or a data flow between the elements of the processor 300, thereby controlling the content generation unit 330, the image recognition unit 350, and the voice recognition unit 360 to perform exclusive functions, respectively. For example, data related to an image to be projected is transmitted to the content generation unit 330 and a user input signal received from one of the image recognition unit 350 and the voice recognition unit 360 includes a content operation signal, image-related data corresponding thereto may be newly generated and transmitted to the content generation unit 330.

Figure 4:
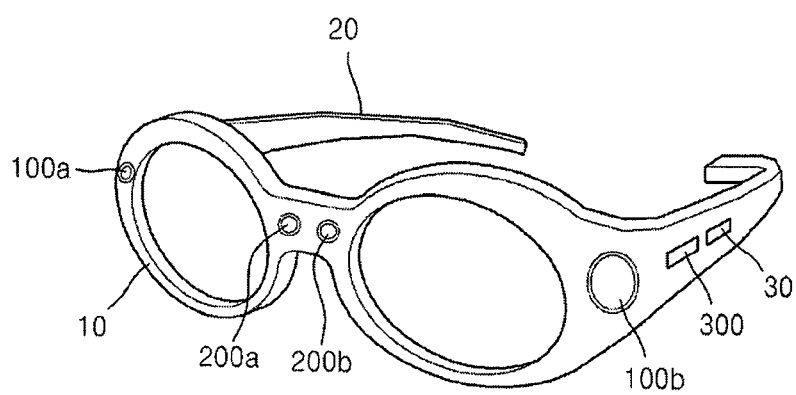
FIG. 4 is a schematic view illustrating eyeglasses having attached projectors, according to another embodiment of the present invention.

FIG. 4 is a view illustrating eyeglasses with projectors according to another embodiment of the present invention.

A modified configuration of the present embodiment will be described and a description of the same parts of the previous embodiment will not be repeated.

Referring to FIG. 4, comparing with the eyeglasses of FIG. 1, there are provided two projectors including a first projector 100a and a second projector 100b and two cameras including a first camera 200a and a second camera 200b. Particularly, the first projector 100a and the second projector 100b are located between a pair of lenses and a supporting unit 20, respectively (e.g., between a left lens and a left supporting unit 20 and between a right lens and a right supporting unit 20, such as being mounted on a connection part between a lens and a corresponding supporting unit 20).

In the present embodiment, a three-dimensional image may be projected by using the first and second projectors 100a and 100b of the eyeglasses of FIG. 4, and a three-dimensional gesture may be received by using the first and second, cameras 200a and 200b. For example, the first projector 100a may project an image for the right eye and the second projector 100b may project an image for the left eye in such a way that the two images are projected on one screen while overlapping each other, thereby providing a three-dimensional image to the user. In addition, depth information may be extracted from a gesture of the user by using a difference between images inputted to the first and second cameras 200a and 200b, respectively (for example, by combining respective images from each of the first and second cameras 200a and 200b to form a three-dimensional image).

Through the present embodiment of FIG. 4, the user may project a three-dimensional image on a screen and may input a control signal for the eyeglasses with the first and second projectors 100a and 100b and the first and second cameras 200a and 200b through a three-dimensional gesture. It should be noted that the first and second projectors 100a and 100b may be the same type of projector, or may be different types (for example, the second projector 100b may be larger than the first projector 100a, or vice versa). The same relationship may be true of the first and second cameras 200a and 200b.

Particular executions described above are just exemplary embodiments and do not limit the scope of the present invention. For briefness of specification, descriptions of general electronic components, control systems, software, and other functions of the systems may be omitted. In addition, connection of lines between elements or connecting elements shown in the drawings are just examples for functional connections and/or physical or circuit connections, which may be replaceable or may be embodied as various additional functional connections, physical connections, or circuit connections in real devices. In addition, if there is no detailed expression such as "essential" or "importantly," the elements are not necessarily needed to apply the embodiments.

In the specification, and more particularly, in the claims, the term "the" and demonstrative terms similar thereto may be used while corresponding to both singular and plural forms. In addition, when a range is mentioned in the specification, if there is no contrary description, individual values including the range are included, which is identical to mention the respective individual values forming the range in the detailed description. If there is neither clear sequence nor contrary mention, operations forming a method according to an embodiment of the present invention may be performed in an appropriate sequence. However, the method embodiment of the present invention is not limited to the order of describing the operations. All examples or exemplary terms such as "for example" or "etc." are used merely to describe the present invention in further detail and do not limit the scope of the present invention if not defined by the claims. In addition, it is understood that one of ordinary skill in the art may configure according to design conditions and factors within a range of the claims, to which various corrections, combinations, and modifications are added, or an equivalent thereof.

While the present invention has been particularly shown and described with reference to exemplary embodiments thereof, it will be understood by those of ordinary skill in the art that various changes in form and details may be made therein without departing from the spirit and scope of the present invention as defined by the following claims, and their equivalents.

What is claimed is:

1. Eyeglasses comprising:
a camera mounted between lenses of the eyeglasses;
a first projector mounted on a connection part between one of the lenses of the eyeglasses and a supporting unit;
a second projector mounted on another connection part between another one of the lenses of the eyeglasses and another supporting unit;
a microphone mounted on the eyeglasses; and
a processor configured to control the camera and the first and second projectors,
wherein the processor is further configured to generate two different projector images to be respectively projected by the first and second projectors away from eyes of a user and overlapping onto a screen to form a three-dimensional image on the screen, and to generate an input signal of the user by analyzing a camera image obtained from the camera and a voice command of the user obtained from the microphone,
wherein the processor comprises a voice recognition unit configured to process and analyze the voice command of the user obtained from the microphone, and to convert the voice command into the user input signal, and
wherein the processor is further configured to detect whether or not the user input signal comprises a content operation signal, and to modify the two different projector images to he respectively projected by the first and second projectors based on the detected content operation signal.

2. The eyeglasses of claim 1, wherein the first and second projectors are pico projectors that are mounted in a frame of the eyeglasses.

3. The eyeglasses of claim 1, wherein the screen is a hand of the user.

4. The eyeglasses of claim 1, wherein the processor comprises:

a content generation unit configured to generate the two different projector images to be respectively projected by the first and second projectors; and
an image recognition unit configured to process and analyze the camera image obtained from the camera and to convert the camera image into the input signal of the user.

5. The eyeglasses of claim 4,
wherein the image recognition unit is configured to detect Whether or not the user input signal a comprises the content operation signal, and
wherein the content generation unit is further configured to modify the projector images based on the detected content operation signal.

6. The eyeglasses of claim 5,
wherein the content operation signal is a gesture of the user, and
wherein the processor is configured to detect the content operation signal by using a gesture recognition algorithm.

7. The eyeglasses of claim 1, wherein a number of cameras mounted on the eyeglasses is two.

8. A method of controlling eyeglasses, the method comprising:
generating first and second projector images to be respectively projected away from eyes of a user and overlapping onto a screen by first and second projectors mounted on the eyeglasses to form a three-dimensional image on the screen;
obtaining a camera image from a camera mounted on the eyeglasses;
generating a first input signal of the user by analyzing the camera image;
generating a second input signal of the user by obtaining and analyzing a voice command of the user obtained from a microphone mounted on the eyeglasses; and
detecting whether or not the user's second input signal comprises a first content operation signal, and modifying the first and second projector images to be respectively projected by the first and second projectors based on the detected first content operation signal.

9. The method of claim 8, wherein the first and second projectors are pico projectors that are mounted in a frame of the eyeglasses.

10. The method of claim 8, wherein the screen is a hand of the user.

11. The method of claim 8, further comprising generating a third projector image by modifying the first projector image when the user's first input signal comprises a second content operation signal with respect to the first projector image.

12. The method of claim 11,
wherein the second content operation signal is a gesture of the user, and
wherein the generating of the user's first input signal comprises detecting the second content operation signal by using a gesture recognition algorithm.

13. The method of claim 8, wherein a number of cameras mounted on the eyeglasses is two.

14. The method of claim 13,
wherein the obtaining of the camera image comprises obtaining two camera images for forming a three-dimensional camera image.

* * * * *